United States Patent [19]

McCabe

[11] 3,960,065

[45] June 1, 1976

[54] AIR CONTROL APPARATUS

[76] Inventor: Francis J. McCabe, 239 Hastings Court, Doylestown, Pa. 18901

[22] Filed: Jan. 20, 1975

[21] Appl. No.: 542,210

[52] U.S. Cl. ................................. 98/40 D; 98/1; 98/86; 160/1; 160/133; 137/75
[51] Int. Cl.² ...................................... F16K 13/04
[58] Field of Search ............ 98/40 D, 1, 86; 137/74, 137/75, 625, 28, 72; 160/1, 133; 49/7

[56] References Cited
UNITED STATES PATENTS

| 685,481 | 10/1901 | Kinnear | 160/133 |
|---|---|---|---|
| 1,029,912 | 6/1912 | Collins | 160/133 |
| 3,401,734 | 9/1968 | McCabe | 160/1 |
| 3,410,311 | 11/1968 | Burdock | 137/625.28 |
| 3,467,163 | 9/1969 | Vassaux | 137/75 |
| 3,687,055 | 8/1972 | Dean, Jr. et al. | 98/40 D |
| 3,756,137 | 9/1973 | Scharres | 98/1 |
| 3,783,771 | 1/1974 | Hartzell et al. | 98/40 D |
| 3,785,272 | 1/1974 | McNabney et al. | 98/40 D |

*Primary Examiner*—John J. Camby
*Assistant Examiner*—Henry C. Yuen
*Attorney, Agent, or Firm*—Frank J. Benasutti Associates Ltd.

[57] ABSTRACT

An air control apparatus is provided comprising a frame housing a plurality of extendable metal curtains spaced from one another in parallel planes, said curtains being extendable between a folded open condition and an unfolded closed condition.

5 Claims, 3 Drawing Figures

AIR CONTROL APPARATUS

BACKGROUND OF THE INVENTION

This invention relates to air duct systems in buildings, and more particularly, to an air controller specifically for use in a ceiling vent, which forms a part of an air handling system.

In the prior art, it is known to mount air ducts above a drop ceiling, in the space between the ceiling and the roof or floor above. The roof or floor is supported by bar joists and the drop ceiling, in part, prevents heat build-up, particularly under conditions where there is a fire below the drop ceiling, and this prevents the bar joists from buckling and the floor above from collapsing. Of course, the dropped ceiling is only partially effective in this regard, and indeed, in those spaces where an air diffuser is provided across the end of an air duct passing through the ceiling, there is ready access to the space between the drop ceiling and the floor above for the hot air generated by the fire. It is known to provide such openings with a heavy steel door having asbestos on both sides, said door being supported by a wire having a fusible link therein which allows the wire to separate under elevated temperatures and allows the door to close once it has separated.

It is my desire by this invention to improve the effectiveness of hot air control under fire conditions by providing a plurality of curtain-type fire dampers mounted in such a way as to provide a buffer space therebetween and greatly reduce the heat build-up between the dropped ceiling and the floor above.

SUMMARY OF THE INVENTION

In accordance with the preferred embodiment of my invention, I provide two curtain-type fire dampers mounted in a single frame; one of which is a standard-type fire damper and the other of which is a volume control damper, as shown in my copending application for same, Ser. No. 542,168 filed Jan. 20, 1975. An advantage of this type of apparatus is that not only is it effective in fire conditions, but also is effective in normal operating conditions to provide air volume control.

Accordingly, it is an object of my invention to provide such an apparatus, and this object as well as others will become apparent from the following description with reference to the accompanying drawings.

DESCRIPTION OF THE PREFERRED EMBODIMENT

Figure 1:
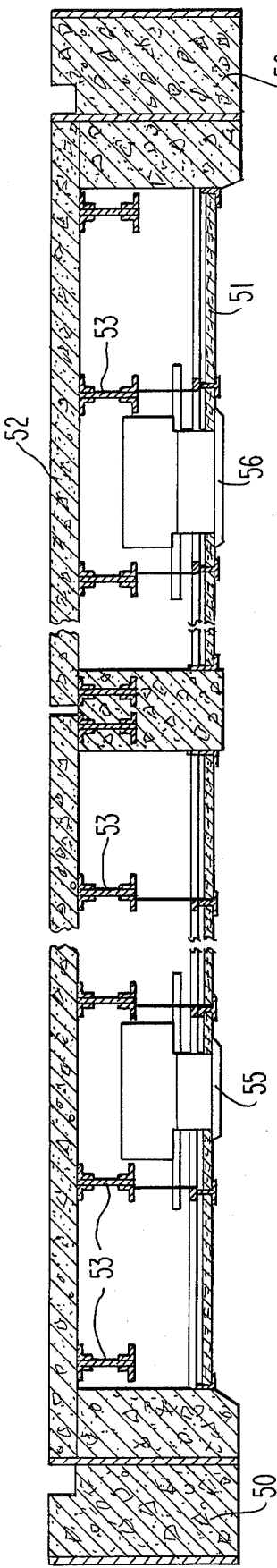
FIG. 1 is a section of an elevation of the building in which a device in accordance with my invention is mounted, showing the environmental relationship between the dropped ceiling and the floor above.

Although specific forms of the invention have been selected for illustration in the drawings, and the following description is drawn in specific terms for the purpose of describing these forms of the invention, this description is not intended to limit the scope of the invention which is defined in the appended claims.

Figure 2:
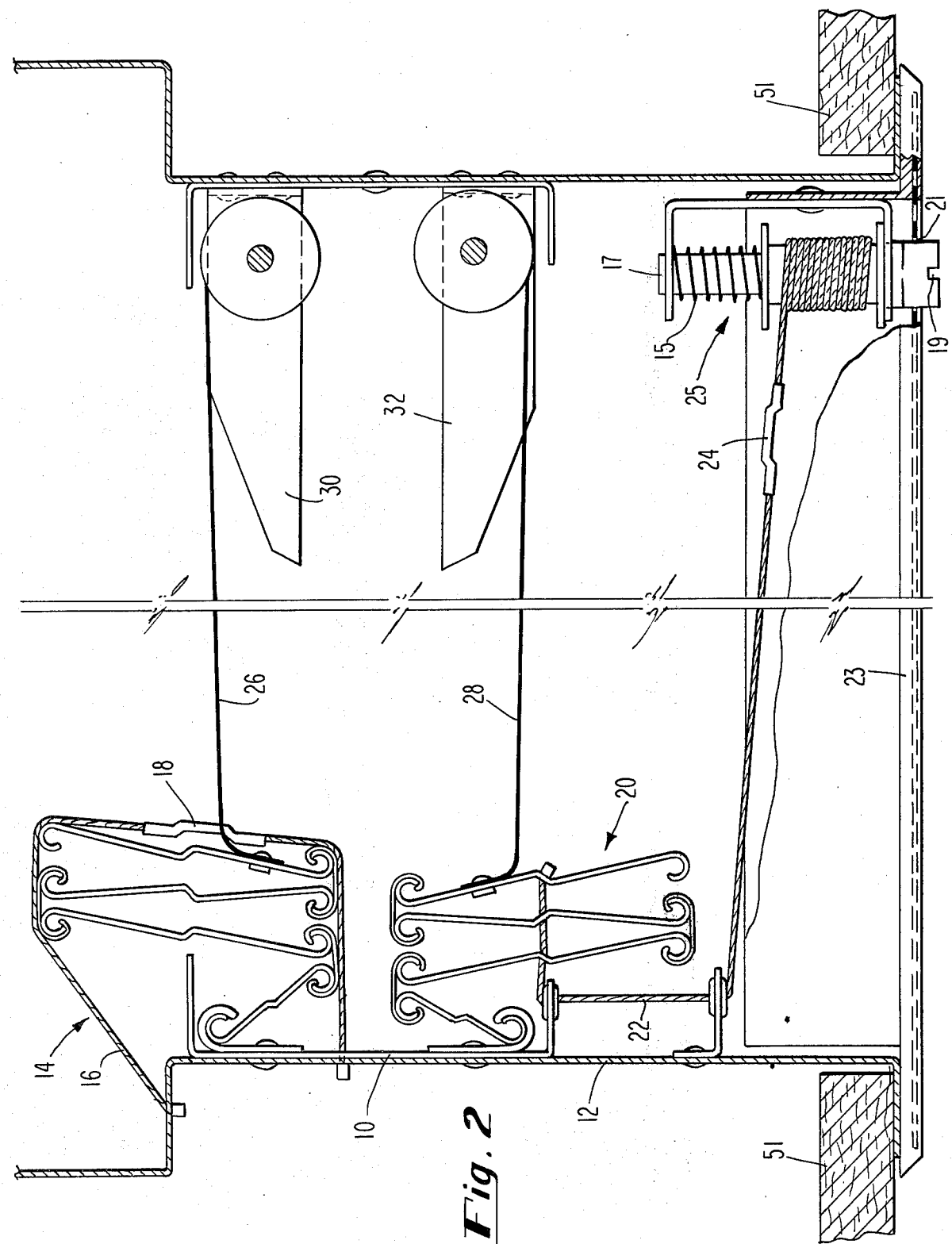
FIG. 2 is an elevation, partially in section, and foreshortened for the sake of clarity, showing an apparatus in accordance with the preferred embodiment of my invention, mounted in its environment relationship in an air duct terminating in an air diffuser, the whole being mounted in a dropped ceiling and air duct, as shown in FIG. 1.

Referring to FIG. 2, the apparatus comprises a single frame mounted within a duct 12 and supporting two sets of blades, each set comprising a plurality of blades interconnected along their longitudinal edges to form a metal curtain similar in structure to the curtain-type fire damper shown in my patent for an articulated barrier U.S. Pat. No. 3,401,734, issued Sept. 17, 1968. The fire damper at the top, designated generally 14, is of standard construction and is retained by the cable 16 in any suitable fashion; the cable having associated with it a releasable link 18. The fire damper on the bottom, designated generally 20, is also retained by a cable 22, but the construction of this damper is such that it is a volume controlled damper. My copending application Ser. No. 542,168, filed Jan. 20, 1975, for a volume controlled damper is incorporated herein by reference and made a part hereof, and therefore, this structure will not be described in greater detail. For present purposes, the damper 20 can be adjusted to a plurality of semi-open, that is, partially unfolded, positions. In these positions, it controls the flow of air through the duct 12 and the damper frame 10.

Figure 3:
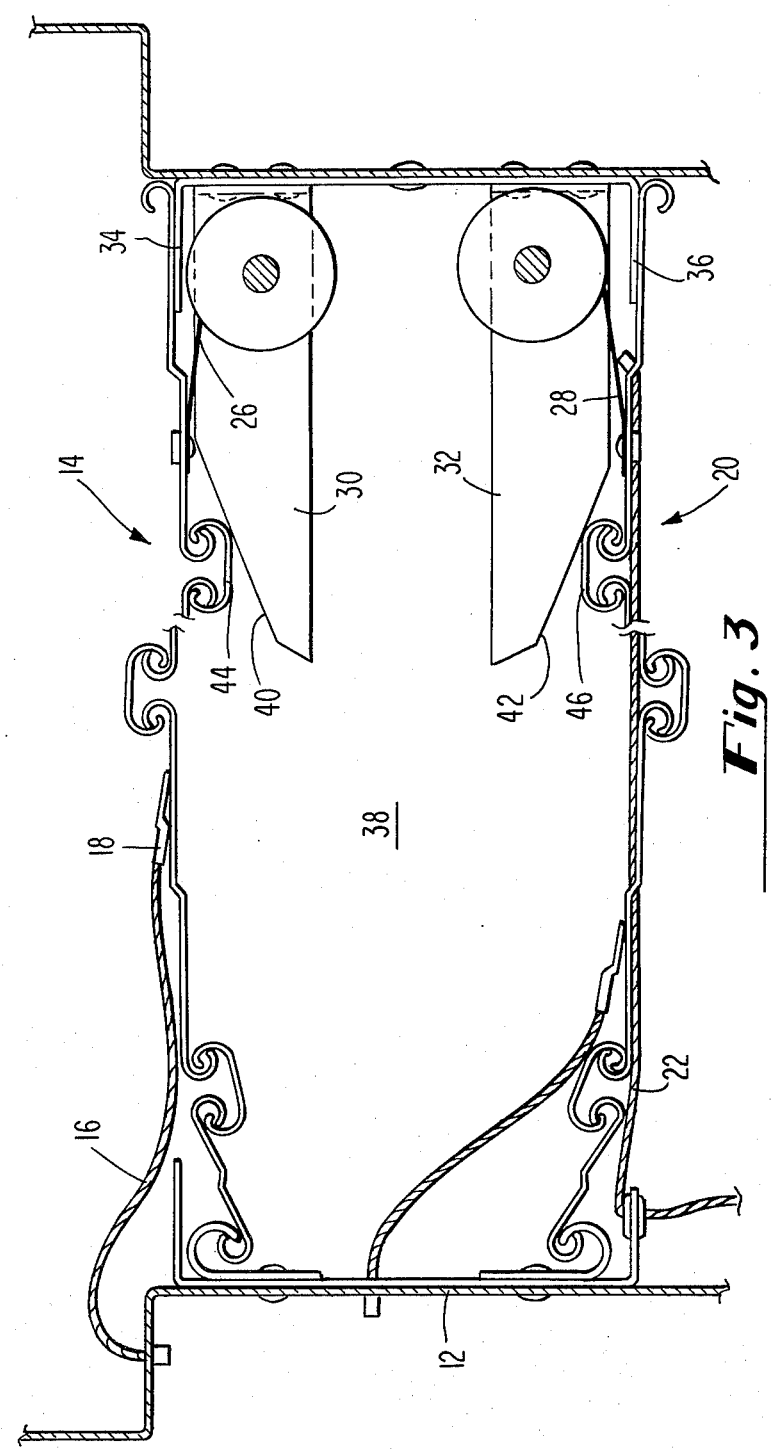
FIG. 3 is an elevation of a portion of the device shown in FIG. 1, with the apparatus shown in an alternate position.

Of course, it will be understood that a single cable could be used about both dampers, and that both could be controlled in their degree of extension or unfolding. Notice that with the arrangement shown, both the link 18 and the link 24 are exposed to the air passing through the duct, so that in the event of a fire, if these are fusible links, they both will react to the warm air rushing through the duct, and when the temperature is elevated sufficiently, both will release and allow the dampers 14 and 20 to close fully, as shown in the alternate position in FIG. 3. The springs 26, 28 and cam elements 30, 32 are the same as those disclosed in my copending application and perform the same functions. Notice, for example, that in the closed position, FIG. 3, the blades lay flush against the upstanding, inwardly depending flanges 34, 36, thereby providing an effective seal against the movement of air from one side of the damper to the other. This effective seal is particularly important in providing an air buffer zone 38, FIG. 3. Notice that in the action shown in FIG. 3, the cam surfaces 40, 42 engage the hinge elements 44, 46 of the respective curtains, and ultimately force the blades against the inwardly depending flanges, which, although not shown specifically in this drawing, extend along the sides of the damper (as is known in the prior art).

The effectiveness of this type of apparatus is at once apparent when one views the typical structure of a building shown in FIG. 1. In that figure, the side walls of the building are shown at 50, the drop ceiling is shown at 51 and the floor or roof above the drop ceiling is shown at 52. Bar joists 53 support the floor 52 and are disposed in the area between the drop ceiling 51 and the floor. Obviously, the openings at 55 and 56 provide an access for hot air through this area. The dimensional stability of a trap door-type air inhibitor system and the inherent restriction of materials used make it apparent that this system would not be as effective as the one described herein in accordance with my invention. It will further be apparent that, when combined with the concept disclosed in my copending application Ser. No. 542,168, filed Jan. 20, 1975 referenced herein, there is provided the added advantage of volume control under normal operating conditions. In such a case, the volume controller 25 coacts with the retracting means (in this case the cable 22 and link 24) to position the damper 20 in a plurality of positions. Also, it will be noted that in this application the curtains are movable horizontally so that the springs 28 and 26 are a necessary adjunct to their operation. Further, the diffuser 23 is provided with a hole 21 for access to the volume controller, so that it can be adjusted by means of a screwdriver inserted in the slot 19 to move the shaft 17 axially against the action of the spring 15 and allow the cable 22 to be played out or reeled up on the spool.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a nonlegal technical statement of the contents of the disclosure in compliance with the Rules of Practice of the United States Patent Office, and is not intended to limit the scope of the invention described and claimed herein.

What is claimed is:

1. An air control apparatus comprising:
   a. a frame having means providing a directed air passage therethrough;
   b. a plurality of sets of blades, each set having a plurality of blades articulated with respect to one another, so that each set can be moved between an open folded condition which allows air to pass through said frame and a closed unfolded condition which substantially restricts the passage of air through said frame; said sets being spaced from one another in said frame in the direction of said air passage therethrough;
   c. at least one set of blades having volume controller means for adjusting the position of said blades between fully unfolded and fully folded at a plurality of positions and retaining it once it is adjusted; and
   d. each of said sets being retained in their respective folded conditions by means coacting with releasable link means to release the blades of said set upon appropriate predetermined temperature conditions and permit the blades to move to a fully unfolded condition, closing said frame to the passage of air therethrough, and providing thereby, in the fully closed condition, a space between said sets of blades which acts as an air buffer to reduce heat transfer across said frame from a region of higher heat to a region of lower heat.

2. The invention of claim 1 wherein closure means are provided operatively engaging said blades for urging said blades to move from a folded to an unfolded condition; and cam means are provided coacting with said blades in cooperation with said closure means to fully close said blades against said frame in the fully unfolded condition.

3. The invention of claim 1 wherein a diffuser is provided adjacent said controller, said diffuser having access means therein to allow adjustment of said controller from the side of said diffuser opposite to the side which is in closest proximity to said controller.

4. The invention of claim 1 wherein said volume controller means comprises a frame having a shaft mounted for rotation therein, said shaft being in engagement with retracting means, such that said retracting means retracts said blades upon rotation of said shaft in one direction and advances upon rotation of said shaft in the opposite direction; and means are provided engaging said shaft to fix the position of said shaft in a plurality of positions.

5. The invention of claim 2 wherein the plurality of blades comprise blade members and connecting members articulated with respect to one another; at least the blade member which is most remote from the blade member which is articulated to the frame of said damper having blade portions separated by a web portion about which said blade member is pivotable within said frame; and the means for urging said blades into a fully closed condition with said frame comprises a cam mounted to said frame engaging the connecting member articulated to said blade which is most remote from the point of articulation of said plurality of blades to said frame, along one surface of said member to pivot said blade about said intermediate portion thereof so that said frame will engage said blade along the terminal blade portion thereof.

* * * * *